United States Patent
Emerson

(10) Patent No.: US 7,405,358 B2
(45) Date of Patent: Jul. 29, 2008

(54) SPLICE FOR DOWN HOLE ELECTRICAL SUBMERSIBLE PUMP CABLE

(75) Inventor: Tod D. Emerson, Cypress, TX (US)

(73) Assignee: Quick Connectors, Inc, Houston, TX (US)

( * ) Notice: Subject to any disclaimer, the term of this patent is extended or adjusted under 35 U.S.C. 154(b) by 0 days.

(21) Appl. No.: 11/581,956

(22) Filed: Oct. 17, 2006

(65) Prior Publication Data

US 2008/0087466 A1    Apr. 17, 2008

(51) Int. Cl.
H02G 3/06    (2006.01)
(52) U.S. Cl. .................................... 174/88 R
(58) Field of Classification Search ............... 174/88 R, 174/76, 91, 93
See application file for complete search history.

(56) References Cited

U.S. PATENT DOCUMENTS

| | | | | |
|---|---|---|---|---|
| 2,639,312 | A | * | 5/1953 | Kerwin ..................... 174/138 F |
| 3,187,088 | A | * | 6/1965 | Warner ........................ 174/91 |
| 4,627,490 | A | | 12/1986 | Moore |
| 4,783,227 | A | | 11/1988 | Meador |
| 4,859,200 | A | | 8/1989 | McIntosh et al. |
| 4,927,386 | A | | 5/1990 | Neuroth |
| 5,289,882 | A | | 3/1994 | Moore |
| 5,403,977 | A | * | 4/1995 | Steptoe et al. ............ 174/77 R |
| 5,478,970 | A | | 12/1995 | Lawler et al. |
| 5,567,170 | A | | 10/1996 | Kroeber |
| 5,661,842 | A | * | 8/1997 | Faust ........................ 385/139 |
| 5,667,009 | A | | 9/1997 | Moore |
| 5,670,747 | A | | 9/1997 | Lawer et al. |
| 5,762,135 | A | | 6/1998 | Moore |
| 5,797,761 | A | | 8/1998 | Ring |
| 6,202,743 | B1 | | 3/2001 | Moore |
| 6,409,485 | B1 | | 6/2002 | Ebner |
| 6,443,780 | B2 | | 9/2002 | Wilbourn et al. |
| 6,545,221 | B1 | | 4/2003 | Halpert et al. |
| 6,676,447 | B1 | | 1/2004 | Knox |
| 6,881,079 | B2 | | 4/2005 | McHugh et al. |
| 6,910,870 | B2 | | 6/2005 | Ebner |
| 6,931,194 | B2 | | 8/2005 | Dowd et al. |
| 6,943,298 | B2 | | 9/2005 | Nicholson et al. |
| 2002/0013093 | A1 | | 1/2002 | Wilbourn et al |
| 2004/0120837 | A1 | | 6/2004 | Ebner |

OTHER PUBLICATIONS

International Search Report issued May 7, 2008 during the prosecution of International Application No. PCT/US07/81651.
Written Opinion issued May 7, 2008 during the prosecution of International Application No. PCT/US07/81651.

* cited by examiner

Primary Examiner—Chau N Nguyen
(74) Attorney, Agent, or Firm—Fulbright & Jaworski, LLP

(57) ABSTRACT

A splicing system that establishes an electrical union between two segments of power cable having internal conductor wires. The splicing system is resistant to electrical failures and the harsh environment existing in subterranean environments during all phases of the hydrocarbon extraction process. The splicing arrangements comprise a protective housing, insulating sleeve and crimp splice working in cooperation to create a sealed power cable connection.

8 Claims, 7 Drawing Sheets

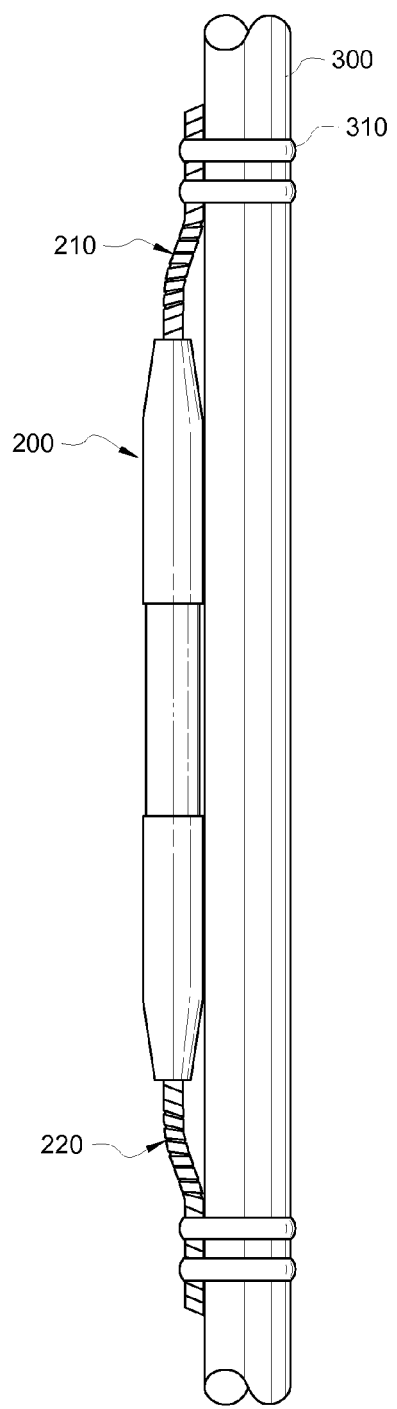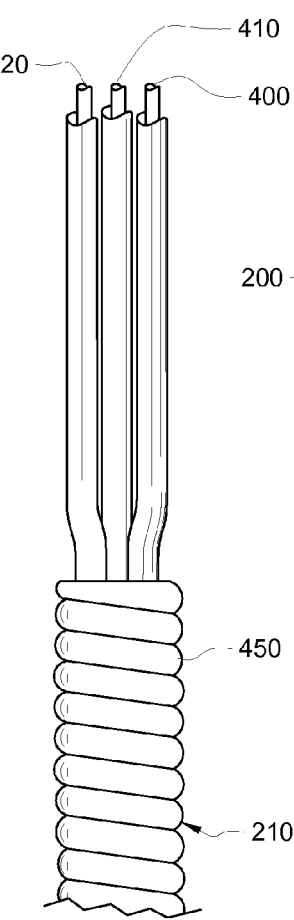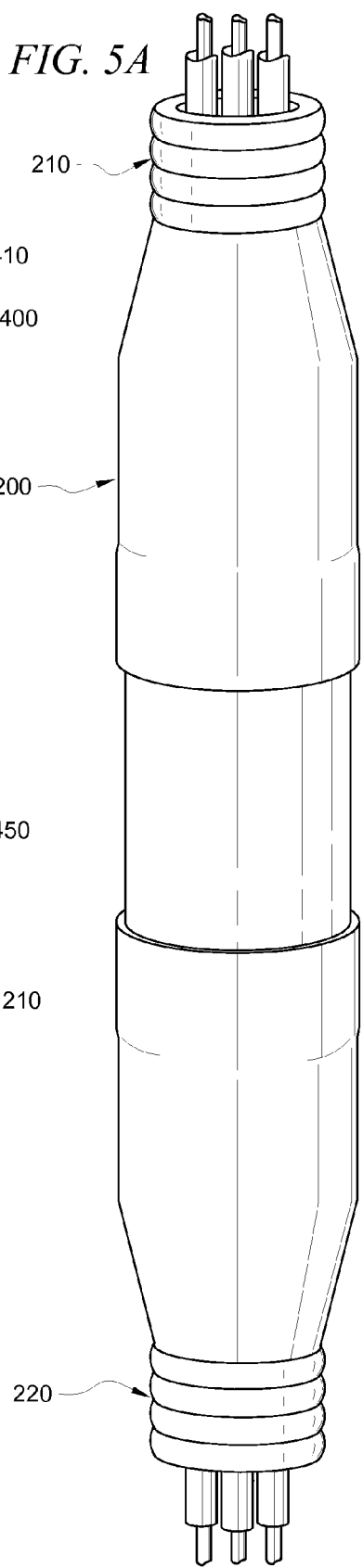

FIG. 11
FIG. 12
FIG. 13
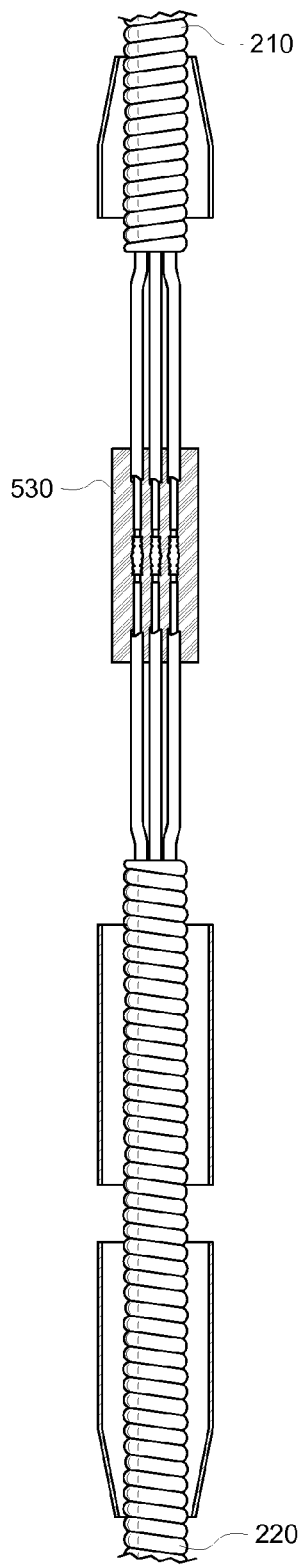
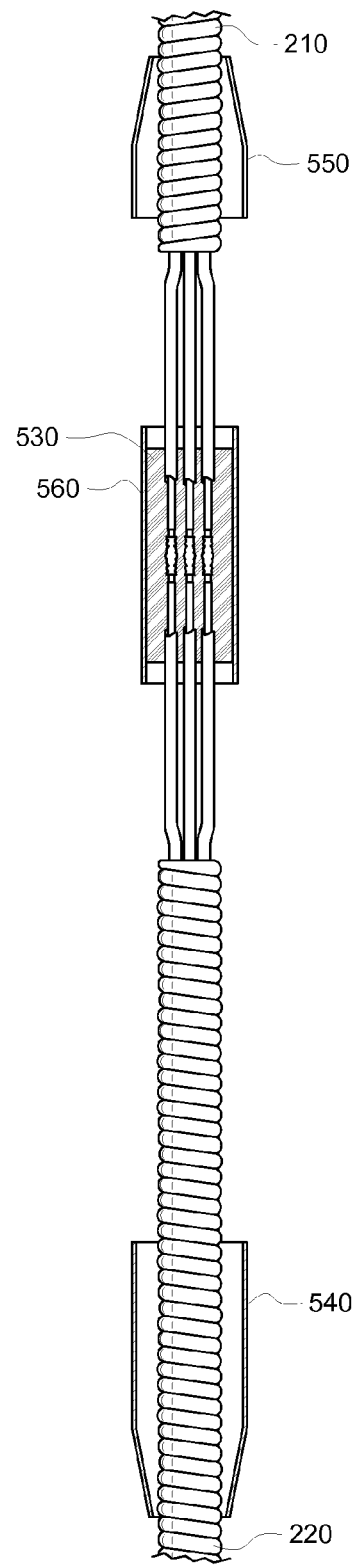
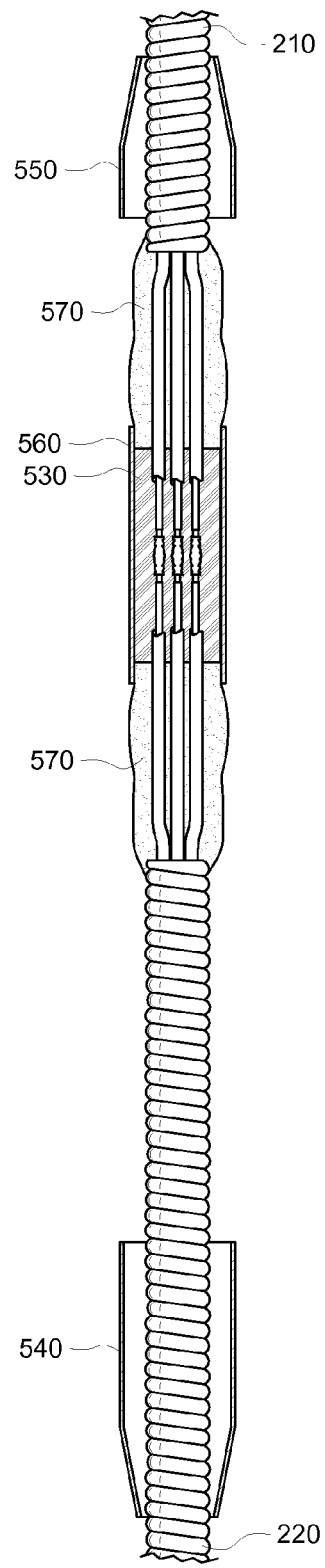

SPLICE FOR DOWN HOLE ELECTRICAL SUBMERSIBLE PUMP CABLE

TECHNICAL FIELD

The present invention relates generally to electrical power cable connection arrangements, such as those used to connect electrical submersible pumping systems within a well bore to a power source at the surface of the well, and in particular a splice arrangement for joining segments of power cable in the well bore.

BACKGROUND OF THE INVENTION

Substantial difficulty has heretofore been encountered in providing splice arrangements for connecting segments of power cable used to supply electricity to down hole submersible pumps and other equipment. Thus, there is a need for an effective and efficient means for splicing together down hole power cable.

Presently known arrangements for splicing electrical power cables use an electrical crimp splice and insulating tapes to establish and maintain electrical connections between the conductive wires of power cable segments. The protective tapes, such as high modulus and high temperature tape, are wrapped around individual crimps and the power cable in presently known arrangements.

Other known arrangements for splicing include attaching an expandable connector that permits lineal movement of the internal segments of a power cable as shown in McHugh et al. U.S. Pat. No. 6,881,079.

The cable splice arrangements presently employed are complicated in that they are difficult and time consuming to install in the field and generally incapable of withstanding the subterranean environment of a well bore over a desired period of time. In particular, the arrangements presently in use may require frequent repair or replacement because the connections are subject to failure under the extreme pressure differential, temperature conditions and high voltage stress encountered in well bore operations.

BRIEF SUMMARY OF THE INVENTION

The present invention was developed to overcome the problems presented by prior splice arrangements used in well bores, and provide a relatively simple sealed electrical splice arrangement to establish and maintain electrical connections between the conductive wires of a first and second segment of power cable.

The present invention provides a power cable connection arrangement that includes crimp splices between the conductive wires of consecutive segments of the power cable, an insulating sleeve with one or more internal passage ways, and a protective housing and transition collars such that the insulating sleeve is positioned to sealably cover the crimp splices and conductive wires. The protective housing is positioned to cover the insulating sleeve. The transition collars are positioned to cover each end of the protective housing.

The foregoing has outlined the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 3 shows the power cable connection assembly coupled to production tubing by cable bands;

FIG. 4 shows three insulated conductive wires extending from a power cable;

FIG. 5A shows the power cable connection in three dimensions with conductive wires extending therefrom.

FIGS. 8-14 show the successive steps for installing the power cable connection assembly.

DETAILED DESCRIPTION OF THE INVENTION

Figure 1:
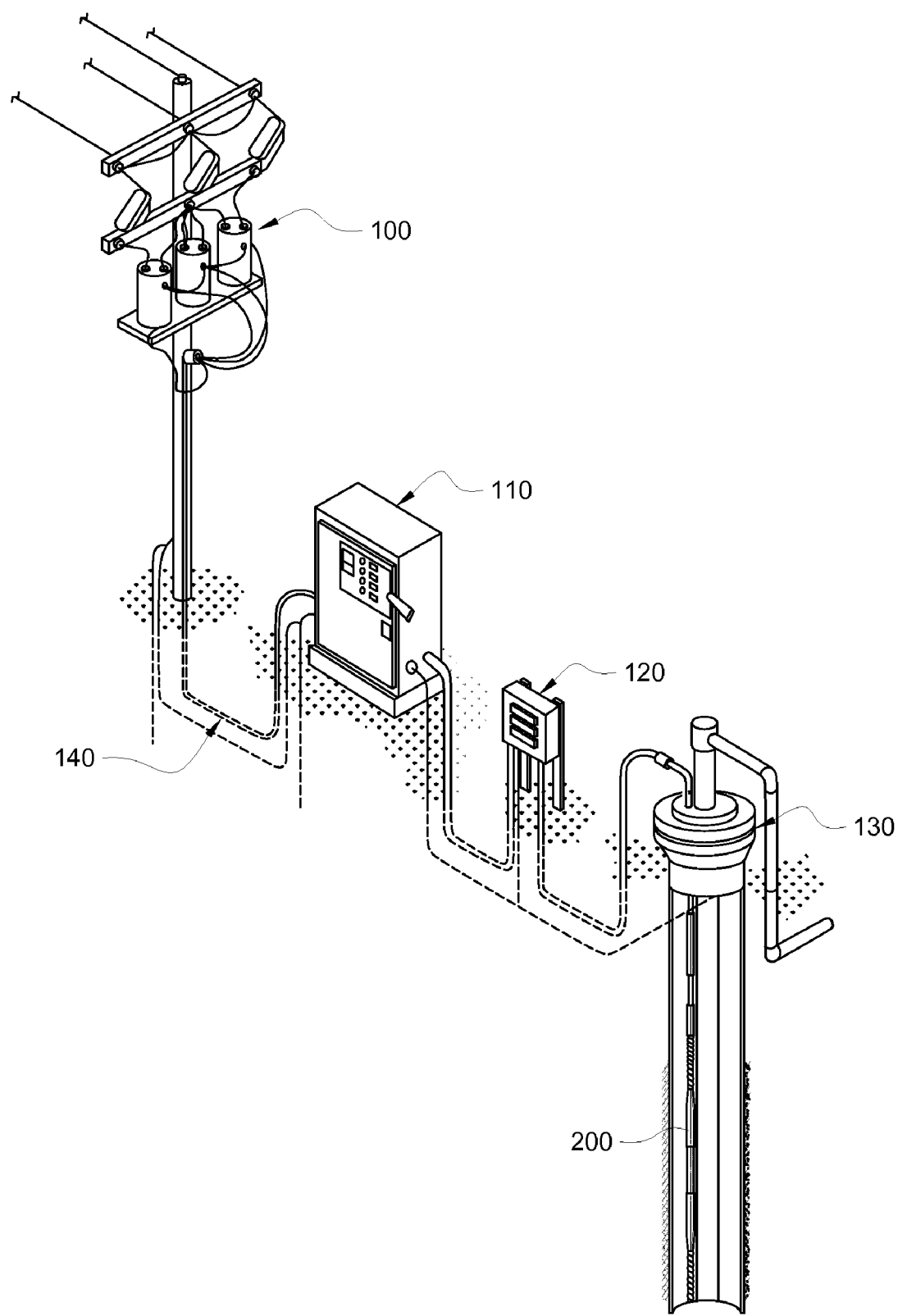
FIG. 1 shows an above ground power source connected to a well head at the surface of the earth.

In the preferred embodiment, the present invention is a splice for electrical power cable that transmits electricity from an above ground power source to down hole electrical equipment such as a submersible pump and, in particular, for splicing sections of power cable located in the well bore, as shown in FIG. 1. There, a remote power source 100 such as a transformer bank on a power pole supply power via cable 140 to a motor control panel 110. The power cable 140 is typically formed of a medium voltage electrical conductor cable that runs from the motor control panel 110 in a known way to a vented junction box 120, and then to a wellhead barrier 130 of an underground well.

Figure 2:
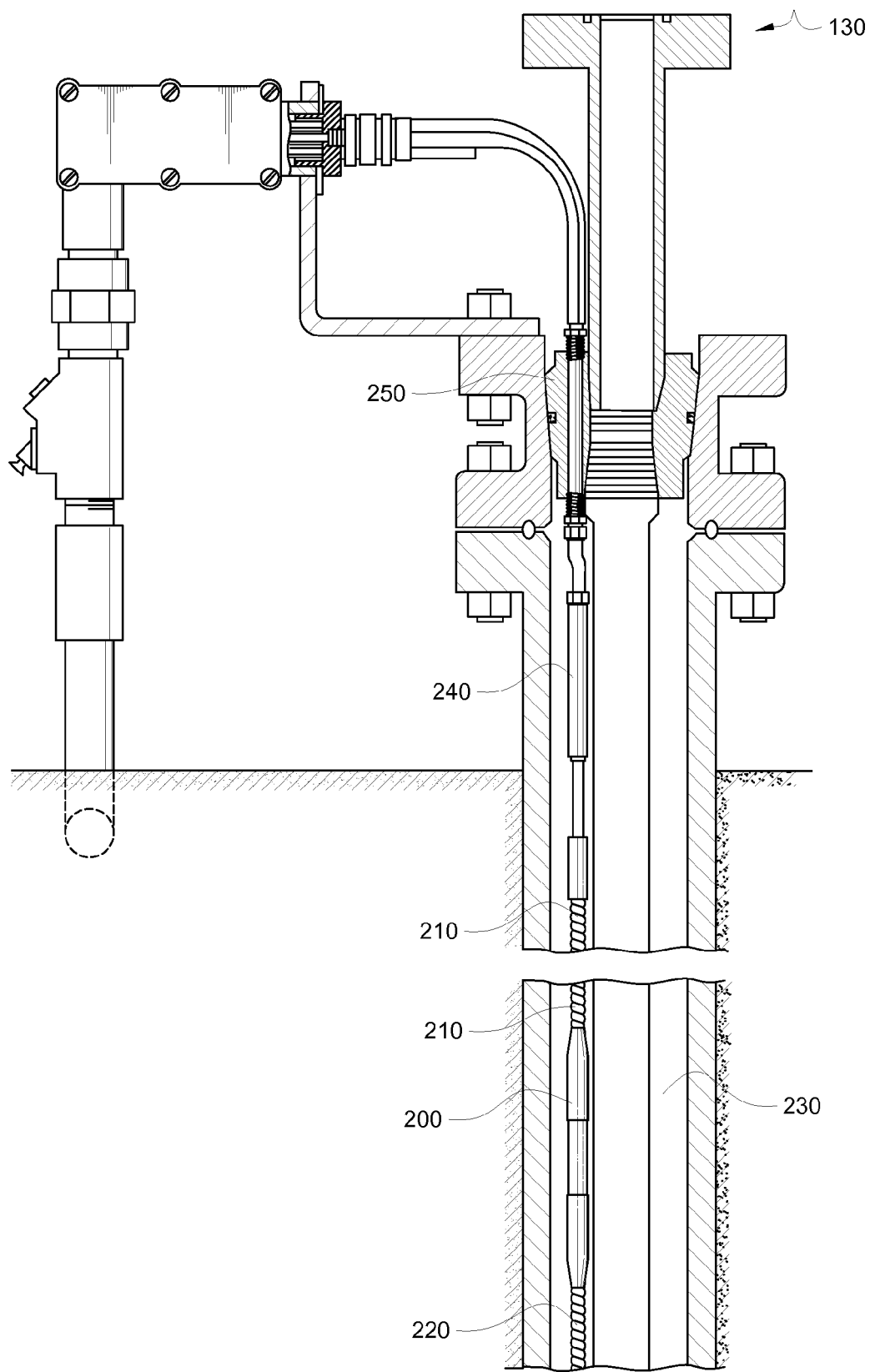
FIG. 2 shows a power cable connection assembly coupled with the power source cable below the well head.

The schematic in FIG. 2 illustrates known equipment for supplying electrical power to an underground well. The conductor cables 140 that transmit electrical power from the remote power source 100 extend through a sealed barrier means 250 at the well head and are received by a separate penetrator assembly represented generally by numeral 240 therebelow. The sealed barrier 250 operates to block the flow of fluid into and out of the well. The penetrator 240 functions as an electrical connection point for the conductor wires of the above ground power cable 140 and the down hole power cable 210 so that electrical power may be run down hole to electrical equipment such as submersible pumps (not shown). The preferred embodiment of the invention relates to joining a first down hole power cable 210 with a second down hole power cable 220 and forming a power cable connection assembly 200 at varying depths below the well head 130 and inside the well bore 230.

Power cable splice connections previously known in the art, such as those which use an electrical crimp splice and protective adhesive tape, are not sufficiently durable to withstand the harsh environment of a well bore over a period of time. Currently, all other cable splices known in the industry lack an effective seal that can prevent undesirable elements such as heat, pressure, mechanical equipment, fluid, sediment, hydrocarbons and debris from interfering with the electrical connection.

A cable splice that is the subject of the invention includes the unique combination of a protective housing, transition collars and insulating sleeve working in cooperation to form an impenetrable covering that is resistant to interference from objects and forces in the well bore. The invention protects the electrical connection therein from undesirable elements that can disrupt the electrical connection or cause it to break down. The invention is also designed to protect the connection from any break or interruption in the transfer of electricity to the down hole equipment in the portion of the power cable that extends through the well.

FIG. 3 shows a power cable connection coupled with production tubing of an underground well 230 by cable bands 310, or other means known in the art. Alternatively, the power cables 210 and 220 and power cable connection assembly 200 may be moveably positioned within or outside of the production tubing 300. The production tubing 300 provides a conduit through which hydrocarbons and other subterranean matter are pumped to the surface and is generally known in the art.

Typically, the remote power source 100, shown in FIG. 1, furnishes conventional three-phase power through a power cable 210 that is made up of three insulated conductive wires 400, 410, and 420 which are covered by a protective armored jacket 450, as shown in FIG. 4. Other types of power cable can also be used including those having one, two or several internal conductive wires which may insulated, uninsulated, a combination of insulated and uninsulated. It should also be specifically noted, embodiments of the present invention are also directed to both round and flat power cables.

Figure 5B:
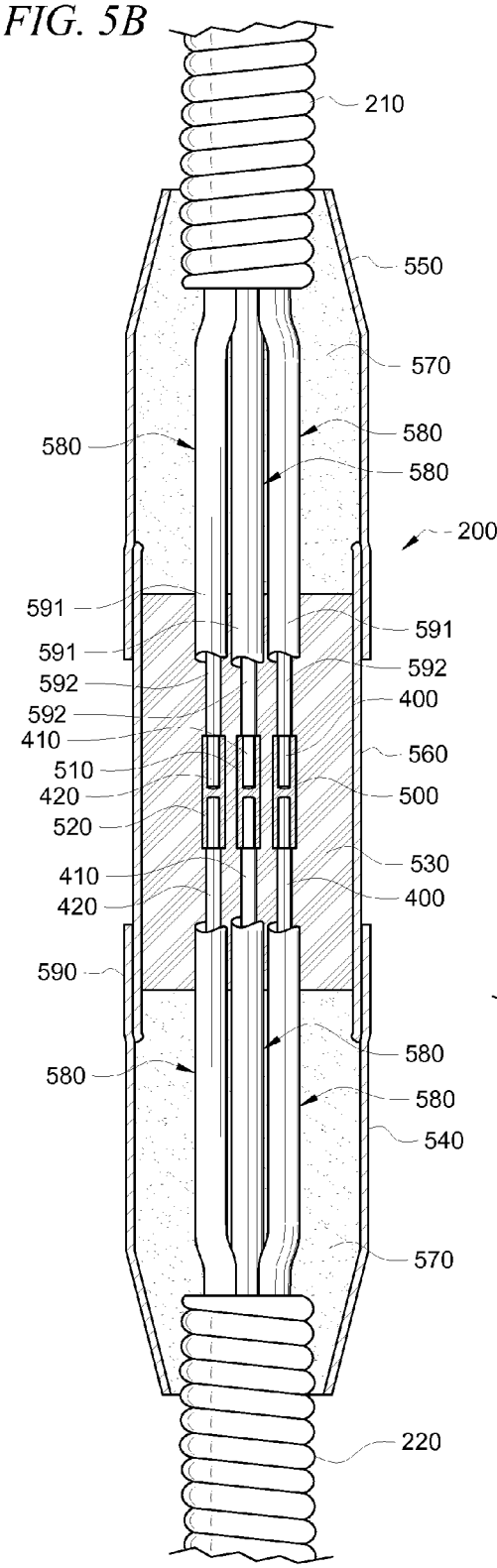
FIG. 5B shows a schematic of the power cable connection assembly having two segments of power cable joined by crimp splice connectors and enshrouded by an insulating sleeve, protective housing and transition collars.

As shown in FIGS. 5A and 5B, the power cable 210 is connected to another cable section 220 through a connector or splice assembly, generally identified by reference 200, that is the subject of the invention. The assembly 200 includes a housing that is impervious to elements naturally existing in the harsh environment of subterranean well bores during all phases of the hydrocarbon extraction processes. The housing is constructed of a highly durable material such as metal, alloy or other composition known by those of skill in the art to be resistant to down hole elements.

FIG. 5B shows the internal workings of the power cable connection assembly 200. There, the conductor wires 400, 410 and 420 of cable 210 are shown coupled with compatible conductor wires of power cable 220 using electrical crimp splices 500, 510 and 520 so as to create an electrical union between the two power cables. A crimp is a device generally known in the art for joining electrical conductor wires. Crimp splices are the preferred means to attach the conductive wires; however, other means generally known to those of skill in the art such as plugs, sockets or welds, which are capable of transferring electricity between power cables may also be used.

In order to seal the crimp splices 500, 510 and 520 from the harsh elements of the well bore, the assembly 200 includes a solid rubber sleeve 530, having parallel internal passage ways, which is installed to cover the crimp splices as shown in FIG. 5B. The assembly 200 also includes transition collars 540 and 550 and a protective housing 560 that are coupled together to form a container enveloping the sleeve 530 and crimps.

The space between the collars 540 and 550 and the insulated conductor wires 580 is filled with an epoxy putty 570. The liquid epoxy putty 570 eliminates air pockets or voids within the assembly 200 and prevents damage to the insulated conductor wires and insulating sleeve 530 during well decompression. The epoxy 570 also fixes the transition collars 540 and 550 in place and protects the conductive wires 580. The transition collars 540 and 550 are optionally friction fitted with the housing 560 so that a shoulder 590 is formed. This type of splice assembly 200 provides an effective electrical connection from the surface to equipment used in the well bore by ensuring crimp splices remain in contact with the conductor wires of the power cables at all times.

It is a further object of the invention to seal and insulate the conductive wires 400, 410 and 420 and crimp splices 500, 510 and 520 from fluid and corrosive elements in the well bore. To that end, an insulating sleeve 530 is designed to cover the power cable union. Although the sleeve is generally solid it includes three passage ways through which the joined conductive wires 400, 410 and 420 and crimp splices 500, 510 and 520 extend. The insulating sleeve 530 is preferably made of elastomer such as EPDM rubber (ethylene propylene diene monomer rubber) or other elastomer generally known in the art. The insulating sleeve 530 is positioned to cover the crimp splices and power cable so that a seal is formed around the crimp splices, exposed and insulated conductors wires 580, insulation 592, and the lead jacket 591, which commonly cover conductor wires.

Figure 6A:
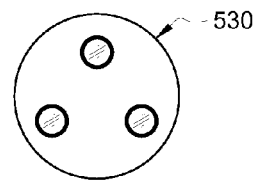
FIGS. 6A and 6B show an insulating sleeve being a three hole rubber housing having plain ends.
Figure 7A:
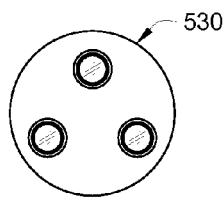
FIGS. 7A and 7B show the insulating sleeve being a three hole rubber housing having nipple ends.
Figure 6B:
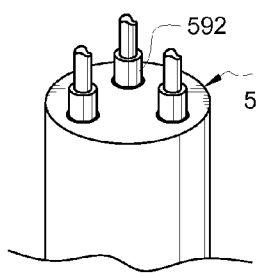
Figure 7B:
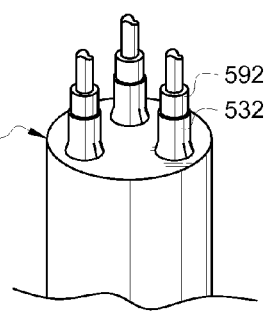

FIG. 6A shows an embodiment of the insulating sleeve with plain ends from a top view while FIG. 6B shows the insulating sleeve 530 with plain ends in three dimensional view. With a slight variation, FIG. 7A shows the insulting sleeve 530 having nipple ends 532 from a top view and FIG. 7B shows the sleeve 530 with nipple ends in three dimensional view. In addition to the round configuration of the insulating sleeve 530 described in FIGS. 7A and 7B, the insulating sleeve may also be adopted to receive the conductive wires of a flat power cable. For flat power cables, the insulating sleeve 530 is configured in a generally cuboid shape having rounded outer edges and adjacent internal passageways running parallel along a common plane. The insulating sleeve for flat power cable may also include nipple or plain ends, like those described in above FIGS. 6 and 7 for the round insulating sleeve 530. It should be noted that, each embodiment of the insulating sleeve 530 operates to sealably protect the assembly 200 and prevent fluid from reaching the conductive wires 400, 410 and 420 and crimp splices 500, 510 and 520.

In a further embodiment, the insulating sleeve 530 is elastomeric and thus suited to expandably form around the conductive wires collectively referred to as numeral 580, their insulation 592 and lead jacket coverings 591. In yet another embodiment, the insulating sleeve is also a dielectric which prevents electric current from flowing between the conductive wires 400, 410 and 420, transition collars 540 and 550 and protective housing 560. These embodiments and others discussed herein operate to effectively seal the crimp splice from the many undesirable elements leading to electrical failure of down hole equipment.

Figure 8:
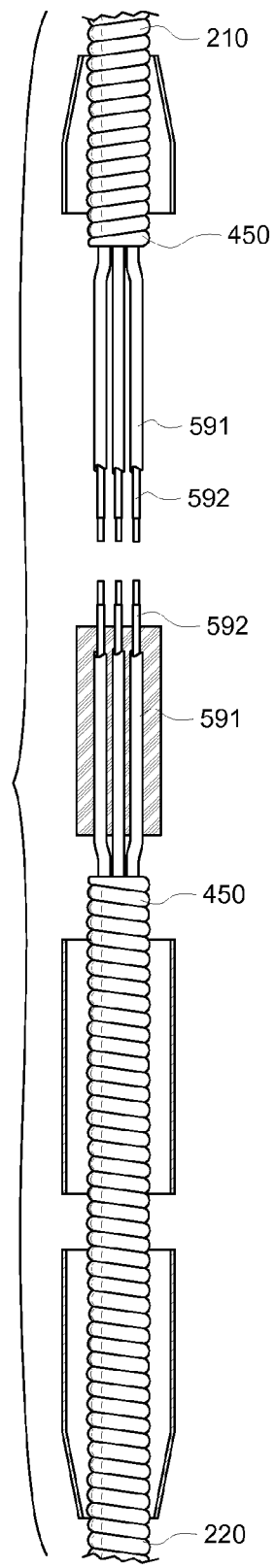
Figure 9:
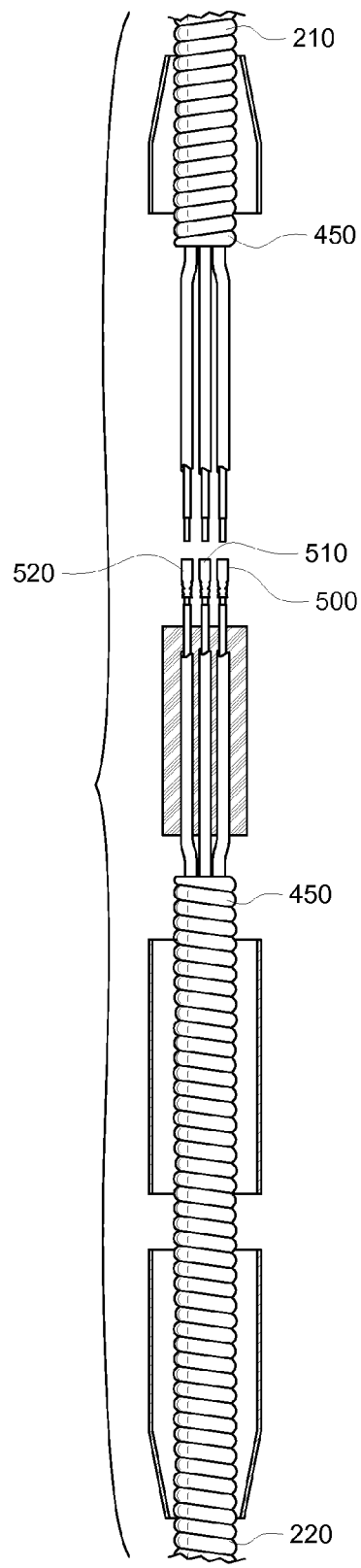
Figure 10:
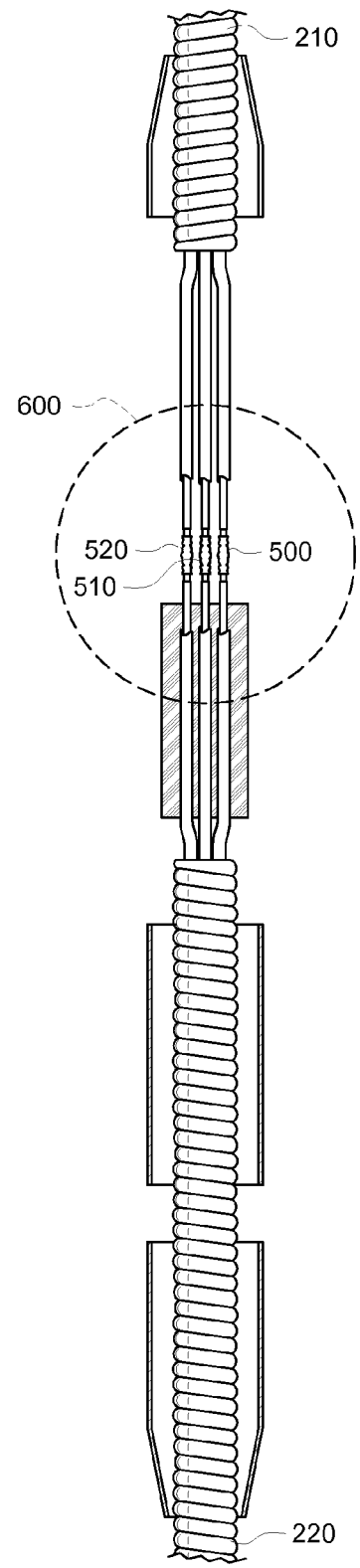

FIGS. 8 though 14 illustrate a method for providing power cable extensions down hole by connecting one or more power cable segments which transfer electrical current to equipment operating at varying depths below the earth's surface. As shown in FIG. 8, a desired length of metal armor 450 is removed from the power cables 210 and 220 exposing the conductor wires of each power cable. The lead jacket 591 and insulation 592 covering the wires are also removed for a desired length so that electrical crimp splices can be attached. In FIG. 9, the crimp splices 500, 510 and 520 are shown attached to the conductive wires of power cable 220. FIG. 10 shows the union 600 of power cables 210 and 220 and crimp splices 500, 510 and 520 attaching to the conductive wires.

In FIG. 11, the insulating sleeve 530 is installed to cover the union 600 and seal the crimp splice connectors and 500, 510 and 520 inside the sleeve 530. In one embodiment, the insulating sleeve 530 is also designed to have an interference fit on the protective coating to fasten the insulating sleeve, crimp splice, conductive wires and protective coatings in place.

As best shown in FIG. 12, a metal protective housing 560 is installed to cover the insulating sleeve 530. This protective housing 560 protects against mechanical equipment that can come in contact with the power cable connection assembly 200. The protective housing also prevents the insulating sleeve 530 from expanding and shoulders against the transition collars 540 and 550.

Figure 14:
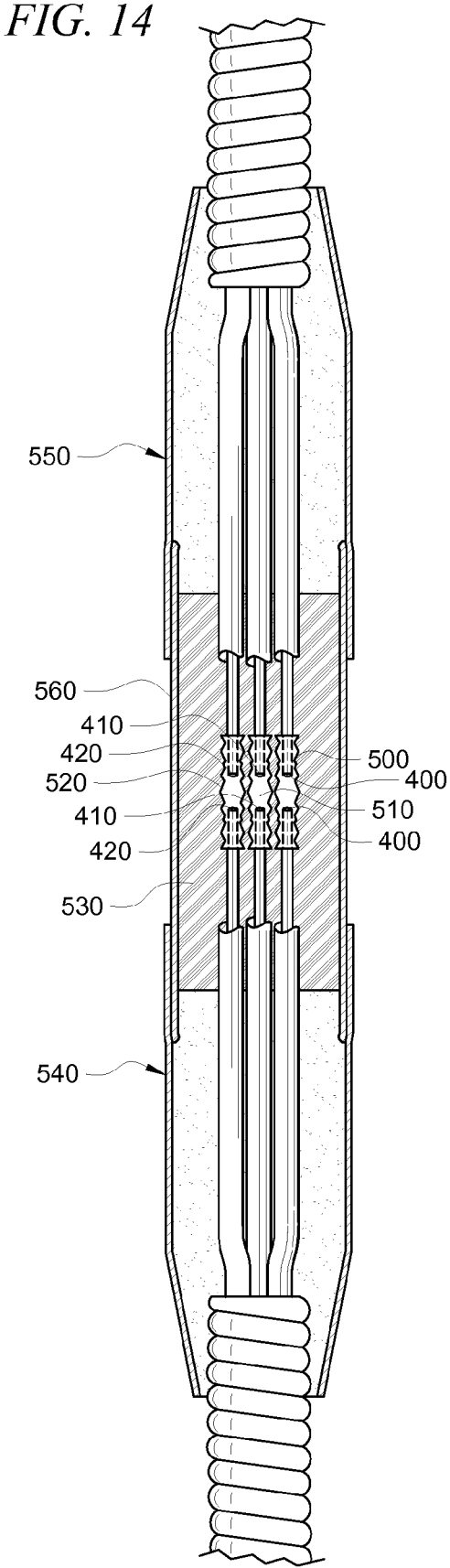

As shown in FIG. 13, epoxy putty 570 is molded or formed about the conductive wires and power cable at the ends of the protective housing 560 and insulating sleeve 530. The epoxy putty further protects the insulating sleeve 530 to prevent decompression of the power cable connection and also protect the individual conductor wires. Transition collars 540 and 550 are then installed to shoulder against the protective housing 560 with a coupling such as a threading, weld, interference fit or other coupling means known in the art. The transition collars and protective housing, having been installed in combination with the aforementioned step, provide the assembled connector 200 as shown in FIG. 14, in which like parts from previous figures are identified with like reference numerals.

By providing a cable splice connection arrangement of the type described above, electrical power generated at the surface of a well can be reliably and efficiently transferred to equipment down hole. The power cable connection formed by this invention is resistant to the harsh environment of well bores and not susceptible to breakdown over time.

The invention also provides a cable splice which is less expensive than ones previously used and which can be easily installed in the field. The power cable connection can be formed on a conventional pump cable of different sizes and types without the need for any special adaptations. Further, the present invention eliminates a number of parts and allows down hole equipment to operate effectively. A great deal of time is also saved during the installation in the field.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A splice connection system for electrical cables that transmit power from an external source to down hole equipment in an underground well, comprising:
    a) first and second power cables with opposed ends and a plurality of conductor wires projecting out of the respective opposed ends, so that the conductor wires in the first cable can be spliced to the conductor wires in the second cable;
    b) a splice connector formed out of a conductive material for connecting each conductor wire in one cable to a conductor wire in the other cable so that electrical power can be transmitted from one cable to the other cable;
    c) an insulating section formed of an insulating material with an internal passageway for receiving and engaging each splice connector and portions of the conductor wires connected by the splice connector, and for separating the various splice connectors and portions of the conductor wires connected by the splice connectors from each other;
    d) a protector formed of multiple rigid pieces comprising:
        a protective housing with opposite ends for covering and engaging the surface of the insulating section; and
        first and second end collars connected to the opposite ends of the protective housing, each end collar extending from the protective housing over an opposed end of one of the power cables and covering the conductor wires projecting out of said opposed end; and
    e) a resilient material in each end collar for encapsulating the portions of the conductor wires and the exposed ends of the power cables inside the end collar.

2. The splice connection system of claim 1, wherein the resilient material comprises an epoxy putty.

3. The splice connection system of claim 1 wherein the splice connectors comprise crimp splices that are crimped to the conductor wires.

4. The splice connection system of claim 1 wherein the protective housing and first and second end collars comprise an interconnected durable container for protecting contents from subterranean elements.

5. The splice connection system of claim 1, wherein protective housing comprises a casing for enveloping the splice connectors.

6. The splice connection system of claim 1, wherein the protective housing comprises a protective housing and end collars coupled thereto through a friction fit.

7. The splice connection of claim 1, wherein the insulating section is formed of a shaped piece of high density dielectric polymer material positioned about the electrical crimps and a section of the conductor wires to form an interference fit sealing electrically conductive portions of the electrical crimp and conductor wires from elements in the well.

8. A method for forming a splice connection for electrical cables that transmit power from an external source to down hole equipment in an underground well, comprising the steps of:
    a) splicing together conductor wires projecting out of opposed ends of first and second power cables located below a well head;

b) moving an insulating section formed of an insulating material with internal passageways, that is pre-positioned over the conductor wires c) moving a protective housing, that is pre-positioned over the conductors wires projecting from one of the power cables, over the insulating section for covering and engaging the outer surface of the insulating section;

d) encapsulating portions of the conductor wires and the exposed ends of the power cables with a resilient insulating material;

e) covering the resilient insulating material with a pair of end collars and connecting the end collars to the protective housing.

* * * * *